(12) United States Patent
Sahara et al.

(10) Patent No.: US 12,032,187 B2
(45) Date of Patent: Jul. 9, 2024

(54) BAND-PASS FILTER AND MANUFACTURING METHOD THEREFOR

(71) Applicant: NIPPON ELECTRIC GLASS CO., LTD., Otsu (JP)

(72) Inventors: Keiichi Sahara, Otsu (JP); Masaaki Imura, Otsu (JP); Tsutomu Imamura, Otsu (JP); Yasutaka Tanabe, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 590 days.

(21) Appl. No.: 17/288,858

(22) PCT Filed: Oct. 24, 2019

(86) PCT No.: PCT/JP2019/041699
§ 371 (c)(1),
(2) Date: Apr. 26, 2021

(87) PCT Pub. No.: WO2020/090615
PCT Pub. Date: May 7, 2020

(65) Prior Publication Data
US 2022/0003908 A1 Jan. 6, 2022

(30) Foreign Application Priority Data

Oct. 31, 2018 (JP) ................................. 2018-205415

(51) Int. Cl.
*G02B 5/28* (2006.01)
*G02B 5/20* (2006.01)

(52) U.S. Cl.
CPC ............ *G02B 5/285* (2013.01); *G02B 5/208* (2013.01); *G02B 5/281* (2013.01)

(58) Field of Classification Search
None
See application file for complete search history.

(56) References Cited

U.S. PATENT DOCUMENTS 5,398,133 A * 3/1995 Tsai ...................... G02B 5/281
359/359
2015/0346403 A1* 12/2015 Jidai ........................ H04N 5/33
359/359
2016/0216419 A1* 7/2016 Sprague ................ G02B 5/207

FOREIGN PATENT DOCUMENTS

CN 106908888 A 6/2017
CN 107209305 A 9/2017
CN 208596240 U 3/2019
(Continued)

OTHER PUBLICATIONS

Office Action issued in Chinese Patent Application No. 201980061335.5 dated Jun. 15, 2022.

*Primary Examiner* — Robert E. Tallman
(74) *Attorney, Agent, or Firm* — Cesari & McKenna, LLP

(57) ABSTRACT

Provided are: a band-pass filter for which filter characteristics can be improved; and a manufacturing method therefor. A band-pass filter 11, which allows light of a specific wavelength region to pass, includes: a substrate 12 which has light transmitting properties; a first dielectric multilayer film 13 that is provided on a first main surface S1 of the substrate 12; and a second dielectric multilayer film 14 that is provided on a second main surface S2 which is opposite the first main surface S1. The first dielectric multilayer film 13 contains a hydrogenated silicon layer. The second dielectric multilayer film 14 contains a hydrogenated silicon layer.

6 Claims, 3 Drawing Sheets

(56) References Cited

FOREIGN PATENT DOCUMENTS

| | | | |
|---|---|---|---|
| JP | 2006301489 | A | 11/2006 |
| JP | 2015161731 | A | 9/2015 |
| JP | 2015184627 | A | 10/2015 |
| JP | 2018504635 | A | 2/2018 |
| WO | 2014/103921 | A1 | 7/2014 |

\* cited by examiner

BAND-PASS FILTER AND MANUFACTURING METHOD THEREFOR

CROSS REFERENCE TO RELATED APPLICATIONS

The present application is a 35 U.S.C. § 371 National Stage Application of International Application No. PCT/JP2019/041699, filed on Oct. 24, 2019, which claims benefit of, and priority to Japanese Patent Application No. 2018-205415, filed Oct. 31, 2018, which is herein incorporated by reference in its entirety.

TECHNICAL FIELD

The present invention is related to a band-pass filter that transmits light in a specified wavelength range and a method for manufacturing the band-pass filter.

BACKGROUND ART

Conventionally, a known band-pass filter transmits light in a specified wavelength range. Patent Document 1 discloses a band-pass filter including a light-transmissive substrate and a dielectric multilayer film arranged on the substrate.

PRIOR ART LITERATURE

Patent Document 1: Japanese Laid-Open Patent Publication No. 2015-184627

SUMMARY OF THE INVENTION

Problems that the Invention is to Solve

The filter characteristics required by the above-described band-pass filter include further increasing transmittance in a specified wavelength range (transmission band) that transmits light and reducing ripples, which are pulsations of a transmission spectrum, in a wavelength range that hinders transmission of light (blocking band).

The objective of the present invention is to provide a band-pass filter that improves the filter characteristics and a method for manufacturing the band-pass filter.

Means for Solving the Problems

A band-pass filter that solves the above-described problems is a band-pass filter that transmits light in a specified wavelength range. The band-pass filter includes a substrate, a first dielectric multilayer film, and a second dielectric multilayer film. The substrate is light-transmissive. The first dielectric multilayer film is arranged on the substrate at a side of a first main surface and includes a hydrogenated silicon layer. The second dielectric multilayer film is arranged on the substrate at a side of a second main surface located opposite the first main surface and includes a hydrogenated silicon layer.

In the band-pass filter, it is preferred that a total thickness of the hydrogenated silicon layer in the second dielectric multilayer film be smaller than a total thickness of the hydrogenated silicon layer in the first dielectric multilayer film.

In the band-pass filter, it is preferred that the total thickness of the hydrogenated silicon layer in the first dielectric multilayer film be within a range of 1700 nm or greater and 3500 nm or less, and the total thickness of the hydrogenated silicon layer in the second dielectric multilayer film be within a range of 250 nm or greater and 2500 nm or less.

In the band-pass filter, it is preferred that a thickness of the second dielectric multilayer film be smaller than a thickness of the first dielectric multilayer film.

In the band-pass filter, it is preferred that the thickness of the first dielectric multilayer film be within a range of 3000 nm or greater and 6500 nm or less, and the thickness of the second dielectric multilayer film be within a range of 600 nm or greater and 4000 nm or less.

A method for manufacturing the band-pass filter that solves the above-described problems includes steps of forming the first dielectric multilayer film on the substrate at the side of the first main surface, and forming the second dielectric multilayer film on the substrate at the side of the second main surface.

Effects of the Invention

The present invention improves the filter characteristics.

MODE FOR CARRYING OUT THE INVENTION

One embodiment of a band-pass filter and a method for manufacturing the band-pass filter will now be described with reference to the drawings.

Figure 1:
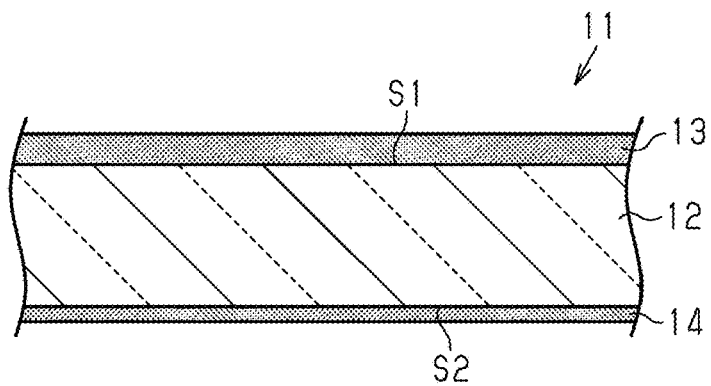
FIG. 1 is a cross-sectional view of a band-pass filter in accordance with one embodiment.

As shown in FIG. 1, a band-pass filter 11 that transmits light in a specified wavelength range includes a substrate 12, a first dielectric multilayer film 13, and a second dielectric multilayer film 14. The substrate 12 is light-transmissive. The first dielectric multilayer film 13 is arranged on the substrate 12 at the side of a first main surface S1. The second dielectric multilayer film 14 is arranged on the substrate 12 at the side of a second main surface S2 that is opposite the first main surface S1.

Preferably, the substrate 12 has, for example, light-transmittance of which the average transmittance is 90% or greater for light in a wavelength of 820 nm or greater and 1000 nm or less. Examples of the substrate 12 include a glass substrate, a crystal substrate, a quartz substrate, a sapphire substrate, and a resin substrate. The substrate 12 may have the form of a flat plate or a curved plate. Preferably, the substrate 12 has a thickness, for example, in a range of 0.1 to 5 mm. A glass substrate is suitable for use as the substrate 12. A glass forming the glass substrate is, for example, silicate glass, borate glass, borosilicate glass, phosphate glass, borophosphate glass, alkali-free glass, $Li_2O \times Al_2O_3 \times nSiO_2$ (LAS-type) glass ceramics, or the like.

The first dielectric multilayer film 13 includes a hydrogenated silicon layer. Preferably, the hydrogenated silicon layer has, for example, a refractive index of 2.9 or greater in the wavelength of 850 nm. The hydrogenated silicon layer has, for example, a refractive index of 4 or less in the wavelength of 850 nm. Since the hydrogenated silicon layer has a refractive index that is higher than that of a layer of oxide or nitride, the incident angle dependency is decreased in the transmission wavelength range of the band-pass filter formed by the dielectric multilayer film including the hydrogenated silicon layer. Further, the hydrogenated silicon layer has a higher average transmittance of light than a silicon layer in a wavelength of 820 nm or greater and 1000 nm or less. This limits decreases in the transmittance in the transmission wavelength range of the band-pass filter formed by the dielectric multilayer film including the hydrogenated silicon layer. Preferably, the hydrogenated silicon layer is amorphous.

The first dielectric multilayer film 13 may further include a low refractive layer that is formed from a material having a lower refractive index than the hydrogenated silicon layer. In the example shown in FIG. 5, the first dielectric multilayer film 13 has a structure including hydrogenated silicon layers (high refractive index layers) 13H and low refractive layers 13L that are alternately stacked. When the first dielectric multilayer film 13 includes one or more hydrogenated silicon layers 13H and one or more low refractive layers 13L, the thickness of each hydrogenated silicon layer 13H and the thickness of each low refractive layer 13L are set or designed in accordance with the optical performance required for the band-pass filter 11. Therefore, the hydrogenated silicon layers 13H of the first dielectric multilayer film 13 may have thicknesses that differ from one another. In the example shown in FIG. 5, the hydrogenated silicon layers 13H have different thicknesses t1$a$ and t1$b$. The same applies to the low refractive layers 13L.

Preferably, the low refractive layer of the first dielectric multilayer film 13 has a refractive index in the wavelength of 850 nm that is less than 2.9 and further preferably less than or equal to 2. The material having a low refractive index that forms the low refractive layer is, for example, at least one selected from niobium oxide, titanium oxide, tantalum oxide, lanthanum oxide, tungsten oxide, zirconium oxide, silicon oxide, aluminum oxide, hafnium oxide, silicon nitride, and magnesium fluoride. Among the materials having a low refractive index, one selected from silicon oxide, aluminum oxide, and magnesium fluoride is preferred.

The first dielectric multilayer film 13 may have a structure stacking multiple low refractive layers formed from different materials having a low refractive index (for example, structure of stacked niobium oxide layers and silicon oxide layers).

Figure 5:
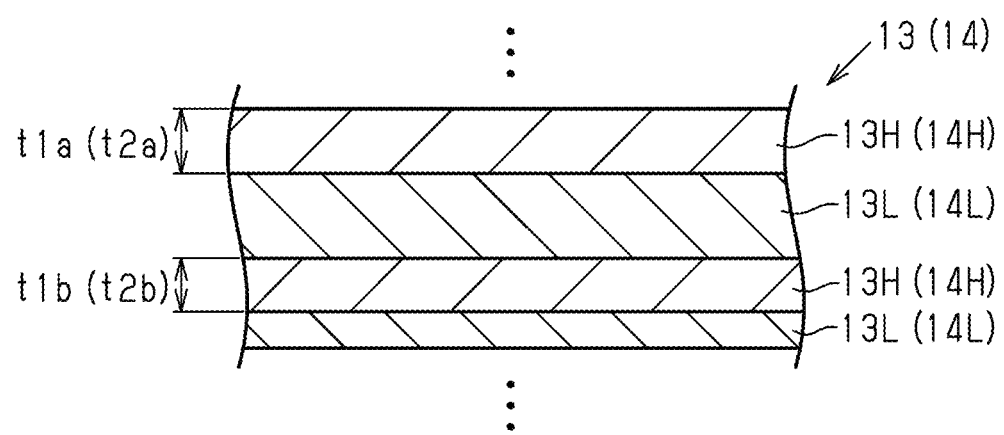
FIG. 5 is a schematic diagram showing a cross section of a dielectric multilayer film of the band-pass filter in accordance with the embodiment.

The second dielectric multilayer film 14 includes a hydrogenated silicon layer in the same manner as the first dielectric multilayer film 13. The second dielectric multilayer film 14 may further include a low refractive layer in the same manner as the first dielectric multilayer film 13. As shown in FIG. 5, the second dielectric multilayer film 14 may have a structure in which hydrogenated silicon layers 14H and low refractive layers 14L are alternately stacked. The materials for the layers of the second dielectric multilayer film 14 may be the same as the first dielectric multilayer film 13. When the second dielectric multilayer film 14 includes one or more hydrogenated silicon layers 14H and one or more low refractive layers 14L, the thickness of each hydrogenated silicon layer 14H and the thickness of each low refractive layer 14L are set or designed in accordance with the optical performance required for the band-pass filter 11. Therefore, the hydrogenated silicon layers 14H of the second dielectric multilayer film 14 may have different thicknesses. In the example shown in FIG. 5, the hydrogenated silicon layers 14H have different thicknesses t2$a$ and t2$b$. The same applies to the low refractive layers 14L.

In the dielectric multilayer film, one or more transition layers may be arranged between the hydrogenated silicon layer and the low refractive layer. In the transition layer, the refractive index gradually decreases or increases from the hydrogenated silicon layer toward the low refractive layer. Further, one or more transition layers may be arranged between the substrate 12 and the dielectric multilayer film. In the transition layer, the refractive index gradually decreases or increases from the dielectric multilayer film toward the substrate 12.

In the band-pass filter 11, the first dielectric multilayer film 13 may be designed as a film imparting a filter characteristic that transmits light in a specified wavelength range. Further, the first dielectric multilayer film 13 reduces reflection of light in the specified wavelength range on the first main surface S1 of the substrate 12. Also, the second dielectric multilayer film 14 of the band-pass filter 11 reduces reflection of light in the specified wavelength range on the second main surface S2 of the substrate 12.

In the filter characteristic (transmission spectrum) imparted by the first dielectric multilayer film 13 including the hydrogenated silicon layer, ripples may occur in a wavelength range (blocking band) that blocks the transmission of light.

In the band-pass filter 11 of the present embodiment, ripples can be reduced by the light absorption of the hydrogenated silicon layers in the second dielectric multilayer film 14. Thus, the second dielectric multilayer film 14 is a film that reduces the ripples.

In the band-pass filter 11, it is preferred that a total thickness of the hydrogenated silicon layers in the second dielectric multilayer film 14 be smaller than a total thickness of the hydrogenated silicon layers in the first dielectric multilayer film 13. This further increases transmittance in the specified wavelength range (transmission band) that transmits light.

Preferably, the total thickness of the hydrogenated silicon layers in the first dielectric multilayer film 13 is within a range of 1700 nm or greater and 3500 nm or less. When the total thickness of the hydrogenated silicon layers in the first dielectric multilayer film 13 is increased, the filter performance can be set with a higher precision, for example, the transmission band can have a narrower half-width. The transmittance in the transmission band can be further increased by decreasing the total thickness of the hydrogenated silicon layers in the first dielectric multilayer film 13.

Preferably, the total thickness of the hydrogenated silicon layers in the second dielectric multilayer film 14 is within a range of 250 nm or greater and 2500 nm or less. When the total thickness of the hydrogenated silicon layers in the second dielectric multilayer film 14 is increased, ripples in the blocking band are further reduced and reflection on the second main surface S2 of the substrate 12 is further limited.

Preferably, the thickness of the second dielectric multilayer film 14 is smaller than that of the first dielectric multilayer film 13. This further increases the transmittance in the transmission band.

Preferably, the thickness of the first dielectric multilayer film 13 is within a range of 3000 nm or greater and 6500 nm or less. When the thickness of the first dielectric multilayer film 13 is increased, the filter performance can be set with a higher precision, for example, the transmission band can have a narrower half-width. The transmittance in the transmission band can further be increased by decreasing the thickness of the first dielectric multilayer film 13.

Preferably, the thickness of the second dielectric multilayer film 14 is within a range of 600 nm or greater and 4000 nm or less. When the thickness of the second dielectric multilayer film 14 is increased, ripples in the blocking band are further reduced and reflection on the second main surface S2 of the substrate 12 is further limited. The transmittance in the transmission band can be further increased by decreasing the thickness of the first dielectric multilayer film 13.

The number of layers of the first dielectric multilayer film 13 and the number of layers of the second dielectric multilayer film 14 are, for example, preferably within a range of four or greater and sixty or less, and further preferably forty or less.

Preferably, the average transmittance in the transmission band of the band-pass filter 11 is 90% or greater. The maximum transmittance in the blocking band of the band-pass filter 11 is preferably 3% or less, further preferably 2% or less, and even further preferably 1% or less.

Preferably, the transmission band of the band-pass filter 11 includes, for example, at least part of a wavelength range of 820 nm or greater and 1000 nm or less. Preferably, the blocking band of the band-pass filter 11 includes, for example, at least part of a wavelength range of 400 nm or greater and 850 nm or less.

The method for manufacturing the band-pass filter 11 will now be described.

The method for manufacturing the band-pass filter 11 includes a step of forming the first dielectric multilayer film 13 on the substrate 12 at the side of the first main surface S1 and a step of forming the second dielectric multilayer film 14 on the substrate 12 at the side of the second main surface S2. In the method for manufacturing the band-pass filter 11, the step of forming the second dielectric multilayer film 14 may be performed after the step of forming the first dielectric multilayer film 13. Alternatively, the step of forming the first dielectric multilayer film 13 may be performed after the step of forming the second dielectric multilayer film 14.

A known film formation process may be used to form the dielectric multilayer film. The film formation process is, for example, sputtering, vacuum vapor deposition, ion beam deposition, ion-plating, or chemical vapor deposition (CVD). Among these film formation processes, sputtering is preferred since the thickness of each layer can be controlled with high precision and the obtained dielectric multilayer film has a stable quality. The sputtering may be performed in accordance with a common procedure. For example, the hydrogenated silicon layer may be formed by the sputtering process using a silicon target under the presence of hydrogen.

The application of the band-pass filter 11 will now be described.

The band-pass filter 11 is suitable for use in, for example, an application that inputs light in a specified wavelength range to a sensor. That is, the band-pass filter 11 is suitable for use in an optical system that is arranged in correspondence with a light receiving portion of a sensor. The band-pass filter 11 may be arranged so that the side of the first main surface S1 of the substrate 12 (side of first dielectric multilayer film 13) corresponds to a side where the sensor is located. Alternatively, the band-pass filter 11 may be arranged so that the side of the second main surface S2 of the substrate 12 (side of second dielectric multilayer film 14) may correspond to a side where the sensor is located.

There is no limit to the application of the sensor. The sensor may be used in, for example, vehicles, robots, aerospace-related applications, analytical instruments, or the like.

Examples and comparative examples of the band-pass filter will now be described.

EXAMPLE 1

As shown in Table 1, the sputtering process was performed to form the first dielectric multilayer film in which hydrogenated silicon layers (Si:H layer) and the silicon dioxide layers ($SiO_2$ layer) were alternately stacked on the first main surface of the substrate (glass substrate). The total number of the hydrogenated silicon layers and the silicon dioxide layers was twenty-seven. Subsequently, the sputtering process was performed to form the second dielectric multilayer film, in which the Si:H layers and the $SiO_2$ layers were alternately stacked on the second main surface of the substrate. The total number of the Si:H layers and the $SiO_2$ layers was sixteen. In this manner, the band-pass filter was obtained. Table 1 shows the total thickness of the Si:H layers in each dielectric multilayer film, the total thickness of the $SiO_2$ layers in each dielectric multilayer film, the thickness of the entire film, and the total number of the layers.

EXAMPLE 2

In example 2, the obtained band-pass filter was the same as example 1 except in that the second dielectric multilayer film was changed as shown in Table 1.

EXAMPLE 3

In example 3, the obtained band-pass filter was the same as example 1 except in that the first dielectric multilayer film and the second dielectric multilayer film were changed as shown in Table 1.

COMPARATIVE EXAMPLE 1

In comparative example 1, the obtained band-pass filter was the same as example 2 except in that the second dielectric multilayer film was omitted as shown in Table 1.

COMPARATIVE EXAMPLE 2

Comparative example 2 is a substrate including the second dielectric multilayer film produced in the same manner as example 1 except in that the first dielectric multilayer film was omitted as shown in Table 2.

COMPARATIVE EXAMPLE 3

In comparative example 3, the obtained band-pass filter was the same as example 1 except in that the Si:H layers of the second dielectric multilayer film were changed to niobium pentoxide layers ($Nb_2O_5$ layer) as shown in Table 2.

TABLE 1

|  |  | Example 1 | Example 2 | Example 3 |
|---|---|---|---|---|
| First Dielectric Multilayer Film | Total Thickness of Si:H Layer (nm) | 1973.8 | 1973.8 | 3122.7 |
|  | Total Thickness of $SiO_2$ Layer (nm) | 1793.4 | 1793.4 | 2876.2 |
|  | Entire Thickness of Film (nm) | 3767.3 | 3767.3 | 5999.0 |
|  | Total Number of Layers | 27 | 27 | 39 |
| Second Dielectric Multilayer Film | Total Thickness of Si:H Layer (nm) | 448.4 | 1957.3 | 383.7 |
|  | Total Thickness of $SiO_2$ Layer (nm) | 839.6 | 1783.2 | 738.8 |
|  | Entire Thickness of Film (nm) | 1228.0 | 3740.5 | 1122.4 |
|  | Total Number of Layers | 16 | 27 | 15 |
| Transmission Band | Wavelength Range | 910 nm to 930 nm | 910 nm to 930 nm | 940 nm to 960 nm |
|  | Average Transmittance (%) | 95.3 | 93.1 | 95.5 |
|  | Maximum Transmittance (%) | 95.8 | 93.4 | 96.0 |
| Blocking Band Wavelength 400 nm to 850 nm | Average Transmittance (%) | 0.02 | 0.06 | 0.01 |
|  | Maximum Transmittance (%) | 0.3 | 1.4 | 0.2 |

TABLE 2

|  |  | Comparative Example 1 | Comparative Example 2 | Comparative Example 3 |
|---|---|---|---|---|
| First Dielectric Multilayer Film | Total Thickness of Si:H Layer (nm) | 1973.8 | 0 | 1973.8 |
|  | Total Thickness of $SiO_2$ Layer (nm) | 1793.4 | 0 | 1793.4 |
|  | Entire Thickness of Film (nm) | 3767.3 | 0 | 3767.3 |
|  | Total Number of Layers | 27 | 0 | 27 |
| Second Dielectric Multilayer Film | Total Thickness of Si:H Layer (nm) | 0 | 448.4 | 0 |
|  | Total Thickness of $SiO_2$ Layer (nm) | 0 | 839.6 | 883.0 |
|  | Total Thickness of $Nb_2O_5$ Layer (nm) | 0 | 0 | 477.7 |
|  | Entire Thickness of Film (nm) | 0 | 1288.0 | 1360.7 |
|  | Total Number of Layers | 0 | 16 | 16 |
| Transmission Band Wavelength 910 nm to 930 nm | Average Transmittance (%) | 92.5 | 94.5 | 96.0 |
|  | Maximum Transmittance (%) | 92.9 | 95.0 | 96.7 |
| Blocking Band Wavelength 400 nm to 850 nm | Average Transmittance (%) | 0.7 | 0.8 | 0.2 |
|  | Maximum Transmittance (%) | 24.0 | 11.0 | 4.2 |

Figure 2:
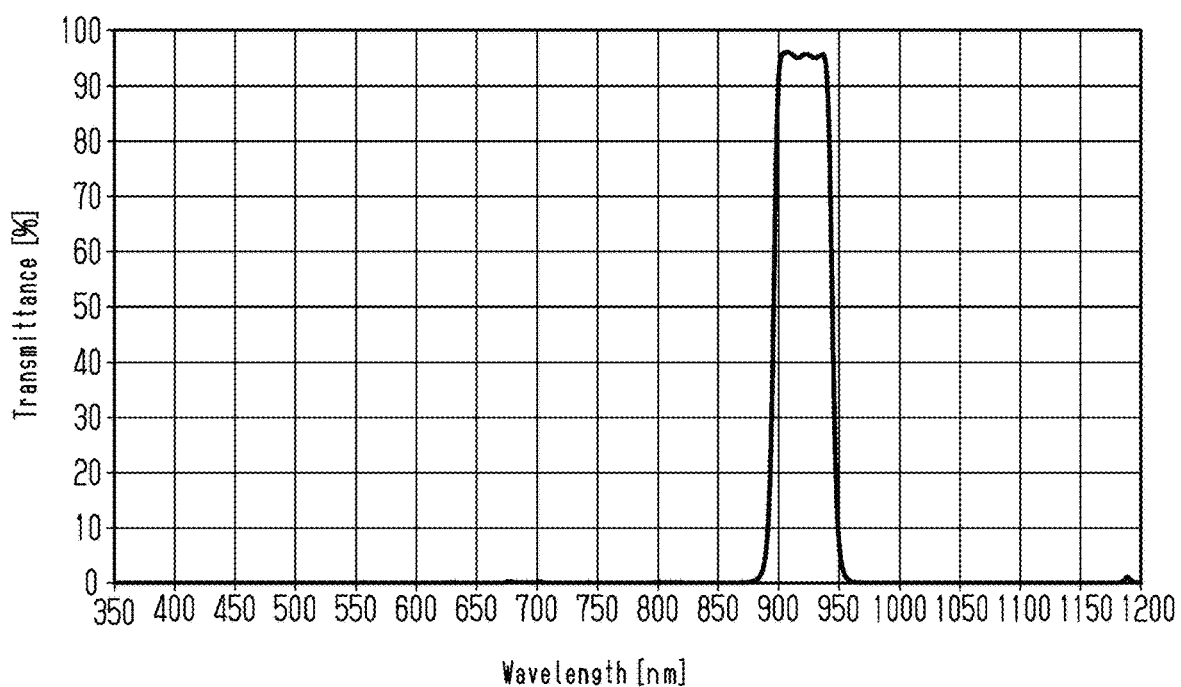
FIG. 2 is a graph showing a transmission spectrum of example 1.

As shown in Table 1 and FIG. 2, in the band-pass filter of examples 1 and 2, the average transmittance was 93.1% or greater in a wavelength range of 910 nm or greater and 930 nm or less (transmission band). In the band-pass filter of example 3, the average transmittance was 95.5% in a wavelength range of 940 nm or greater and 960 nm or less (transmission band). Also, in the band-pass filter of examples 1 to 3, the maximum transmittance was 1.4% or less in a wavelength range of 400 nm or greater and 850 nm or less (blocking band).

As shown in Table 1, the band-pass filter of example 1 and 3 had the maximum transmittance of 0.3% or less in a wavelength range of 400 nm or greater and 850 nm or less (blocking band), thereby having a filter characteristic superior to the band-pass filter of example 2.

Figure 3:
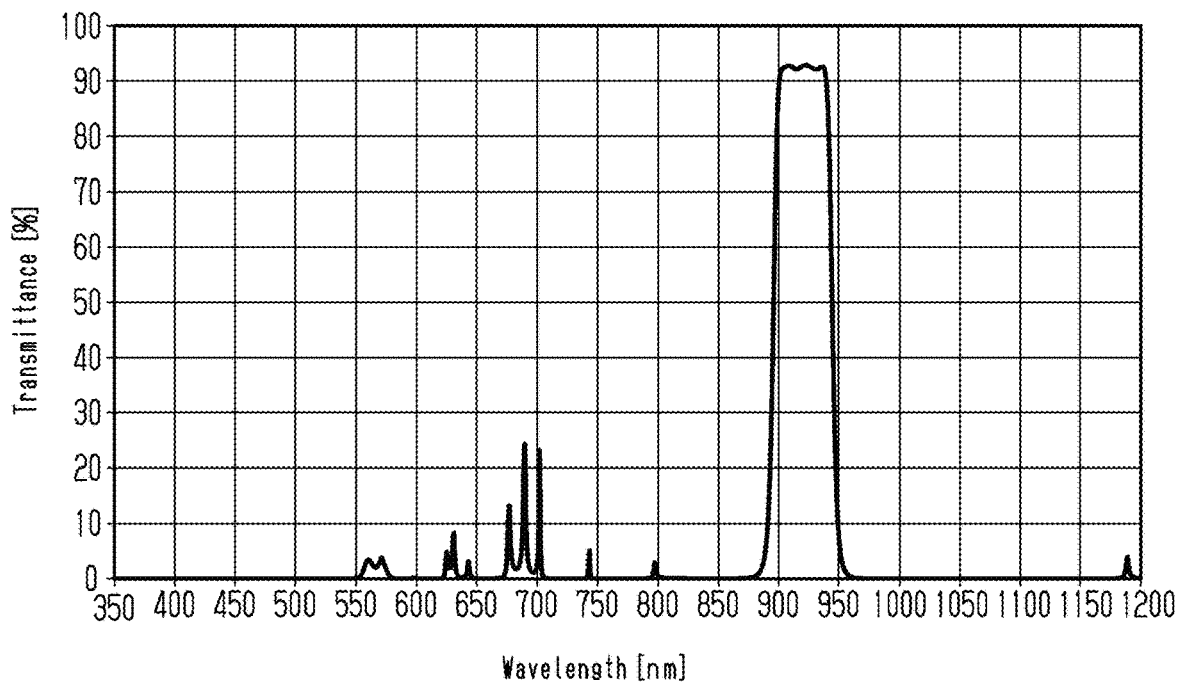
FIG. 3 is a graph showing a transmission spectrum of comparative example 1.

As shown in FIG. 3, in the band-pass filter of comparative example 1, ripples occurred in a wavelength range of 400 nm or greater and 850 nm or less (blocking band).

Figure 4:
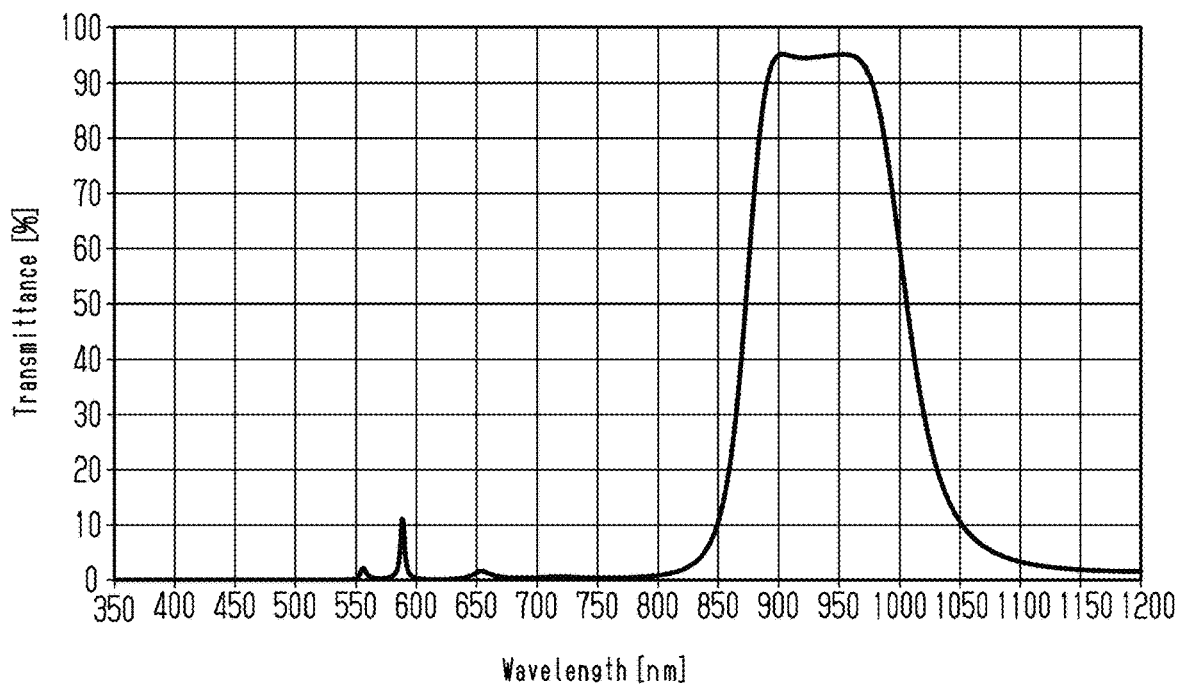
FIG. 4 is a graph showing a transmission spectrum of comparative example 2.

Table 2 and FIG. 4 show that the transmission spectrum of the substrate including the second dielectric multilayer film of comparative example 2 does not have a transmission band with a narrow half-width.

As shown in Table 2, the band-pass filter of comparative example 3 had the maximum transmittance of 4.2% in a wavelength range of 400 nm or greater and 850 nm or less (blocking band), thereby having a filter characteristic inferior to the band-pass filter of the examples.

In examples, the SiO$_2$ layer was used as the low refractive layer. However, even if a low refractive layer other than the SiO$_2$ layer was used, the same advantages would have been obtained.

The operation and advantages of the present embodiment will now be described.

(1) The band-pass filter 11 includes the substrate 12 that is light-transmissive, the first dielectric multilayer film 13 arranged on the substrate 12 at the side of the first main surface S1, and the second dielectric multilayer film 14 arranged on the substrate 12 at the side of the second main surface S2 that is opposite the first main surface S1. The first dielectric multilayer film 13 and the second dielectric multilayer film 14 of the band-pass filter 11 each include a hydrogenated silicon layer.

This structure allows a filter characteristic to be imparted by the first dielectric multilayer film 13 that includes a hydrogenated silicon layer. In this case, even if ripples occur in the blocking band of the filter characteristic, the hydrogenated silicon layer included the second dielectric multilayer film 14 absorbs light and reduces ripples. Further, the second dielectric multilayer film 14 of the band-pass filter 11 limits reflection on the second main surface S2 of the substrate 12, thereby increasing the transmittance in the transmission band of the band-pass filter 11. This improves the filter characteristic.

(2) In the band-pass filter 11, it is preferred that the total thickness of the hydrogenated silicon layers in the second dielectric multilayer film 14 be smaller than the total thickness of the hydrogenated silicon layers in the first dielectric multilayer film 13. This further increases the transmittance of the band-pass filter 11 in the transmission band. Therefore, the filter characteristic is further improved.

(3) In the band-pass filter 11, it is preferred that the total thickness of the hydrogenated silicon layers in the first dielectric multilayer film 13 be within a range of 1700 nm or greater and 3500 nm or less, and the total thickness of the hydrogenated silicon layers in the second dielectric multilayer film 14 be within a range of 250 nm or greater and 2500 nm or less. This allows the filter characteristic to be set with a higher precision. Furthermore, the occurrence of ripples is reduced in the blocking band while the transmittance is increased in the transmission band.

(4) For example, when the transmission band of the first dielectric multilayer film 13 is set so that the maximum transmittance is 90% or greater in a wavelength range of 910 nm or greater and 930 nm or less, ripples having a relatively high maximum transmittance are likely to occur in the blocking band. More specifically, ripples having the maximum transmittance of 10% or greater may occur in the blocking band, which includes a wavelength range of 400 nm or greater and 850 nm or less.

The band-pass filter 11 of the present embodiment includes the second dielectric multilayer film 14 including a hydrogenated silicon layer. Thus, even the above-described ripples having the maximum transmittance of 10% or greater are readily reduced, for example, until the maximum transmittance becomes 2% or less.

DESCRIPTION OF THE REFERENCE NUMERALS 11) band-pass filter, 12) substrate, 13) first dielectric multilayer film, 14) second dielectric multilayer film, S1) first main surface, S2) second main surface.

The invention claimed is:

1. A band-pass filter that transmits light in a specified wavelength range, the band-pass filter comprising:
   a substrate that is light-transmissive;
   a first dielectric multilayer film that is arranged on the substrate at a side of a first main surface and includes a hydrogenated silicon layer; and
   a second dielectric multilayer film that is arranged on the substrate at a side of a second main surface located opposite the first main surface and includes a hydrogenated silicon layer,
   wherein
   a total thickness of the hydrogenated silicon layer in the first dielectric multilayer film is within range of 1700 nm or the greater and 3500 nm or less, and
   a total thickness of the hydrogenated silicon layer in the second dielectric multilayer film is within a range of 250 nm or greater and 2500 nm or less.

2. The band-pass filter according to claim 1, wherein the total thickness of the hydrogenated silicon layer in the second dielectric multilayer film is smaller than the total thickness of the hydrogenated silicon layer in the first dielectric multilayer film.

3. The band-pass filter according to claim 1, wherein a thickness of the second dielectric multilayer film is smaller than a thickness of the first dielectric multilayer film.

4. The band-pass filter according to claim 3, wherein
   the thickness of the first dielectric multilayer film is within a range of 3000 nm or greater and 6500 nm or less, and
   the thickness of the second dielectric multilayer film is within a range of 600 nm or greater and 4000 nm or less.

5. A method for manufacturing the band-pass filter according to claim 1, the method comprising the steps of:
   forming the first dielectric multilayer film on the substrate at the side of the first main surface; and
   forming the second dielectric multilayer film on the substrate at the side of the second main surface,
   wherein
   a total thickness of the hydrogenated silicon layer in the first dielectric multilayer film is within range of 1700 nm or greater and 3500 nm or less, and
   a total thickness of the hydrogenated silicon layer in the second dielectric multilayer film is within range of 250 nm or greater and 2500 nm or less.

6. A band-pass filter that transmits light in a specified wavelength range, the brand-pass filter comprising:
   a substrate that is light-transmissive;
   a first dielectric multilayer film that is arranged on the substrate at a side of a first main surface and includes a hydrogenated silicon layer; and
   a second dielectric multilayer film that is arranged on the substrate at a side of a second main surface located opposite the first main surface and includes a hydrogenated silicon layer,
   wherein a thickness of the second dielectric multilayer film is smaller than a thickness of the first dielectric multilayer film,
   wherein the thickness of the first dielectric multilayer film is within a range of 3000 nm or greater and 6500 nm or less, and the thickness of the second dielectric multilayer film is within range of 600 nm or greater and 4000 nm or less.

* * * * *